July 9, 1963
R. J. COHEN
3,096,657
SINGLE AXIS INTEGRATING ACCELEROMETER
Filed Dec. 6, 1960
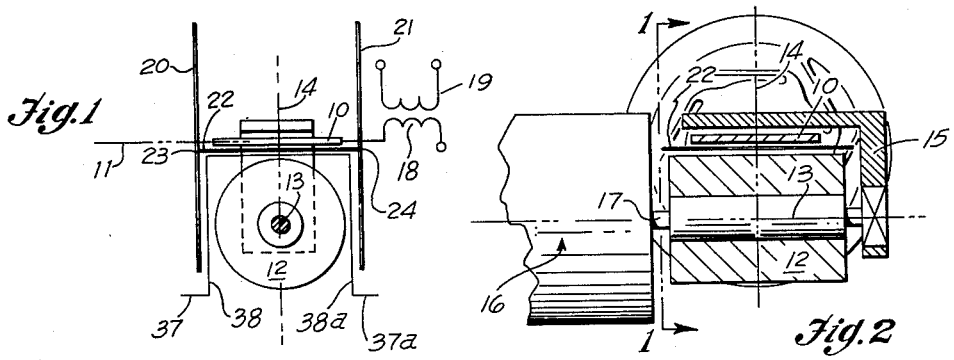
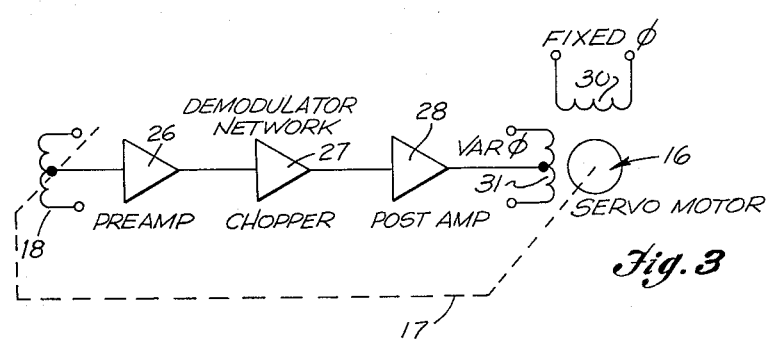
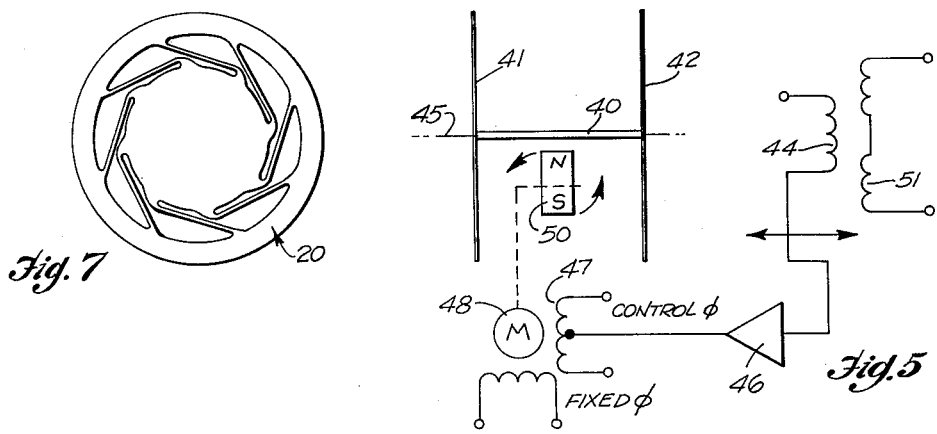
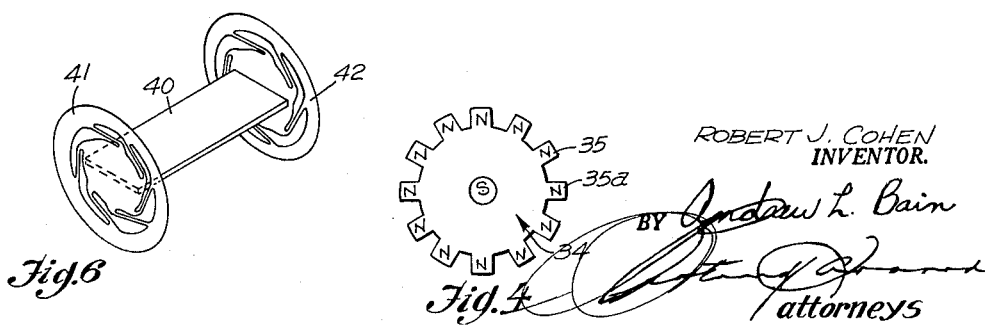
ROBERT J. COHEN
INVENTOR.
BY
attorneys

United States Patent Office 3,096,657
Patented July 9, 1963

3,096,657
SINGLE AXIS INTEGRATING ACCELEROMETER
Robert J. Cohen, Wyckoff, N.J., assignor to General Precision Inc., Little Falls, N.J., a corporation of Delaware
Filed Dec. 6, 1960, Ser. No. 75,057
10 Claims. (Cl. 73—517)

This invention generally relates to improvements in linear integrating accelerometers for air craft and other vehicles and is particularly concerned with such accelerometers wherein the integrating function is integrally incorporated in the acceleration detection mechanism.

In the construction of accelerometers of known types, one of the most serious problems and sources of error resides in the suspension of the acceleration responsive mass. The mass in such devices must be supported in such manner as to be relatively insensitive to gravity and other forces directed along axes other than the sensitive axis yet be relatively free from friction and other undesired restraining forces to provide maximum sensitivity to accelerations along the sensitive axis.

In air-borne and related applications, such instruments are also subjected to vibration and other undesired transients which must be separated from the desired acceleration signal. The net result is that such accelerometer devices are often quite complex and expensive, both to manufacture, as well as align, and service and, in addition, are quite often considerably larger and heavier than is desired for aircraft and other portable applications.

Where the instrument is to be employed for detecting both acceleration and velocity, the structure is most generally even more complex since it must in addition provide either a separate means or mechanism for integrating the detected accelerational forces to provide the velocity measurement or otherwise provide a force-sensitive detecting device that in some fashion provides the integrating function.

It is an object of the present invention to provide an integrating accelerometer that is spring suspended in a novel manner to eliminate pivot friction and other errors resulting from undesired cross-accelerations.

A further object is to provide an integrally constructed and functioning accelerometer and velocity measuring device of improved sensitivity along the measuring axis and that is relatively insensitive to cross-accelerations or other undesired forces.

A still further object is to provide an integral integrating accelerometer of smaller size, lighter weight, and reduced complexity.

Other objects and many additional advantages will be more readily understood by those skilled in the art after a consideration of the following detailed specification taken with the accompanying drawings wherein:

FIGURE 1 is an end view schematically illustrating one preferred accelerometer according to the invention.

FIGURE 2 is a side elevational view of the embodiment of FIGURE 1.

FIGURE 3 is an electrical schematic block diagram illustrating a preferred follow-up control.

FIGURE 4 shows an end elevational view of a modification of the permanent magnet shown in FIGURES 1 and 2.

FIGURE 5 is a schematic front elevational view of a modification of the accelerometer, shown in FIGURES 1 and 2.

FIGURE 6 is a schematic perspective view of the modification of the accelerometer shown in FIGURES 1 and 2.

FIGURE 7 is a front elevational view, of one of the geophysical springs used in conjunction with the accelerometer shown in FIGURES 1 and 2.

Referring now to the drawings for consideration of one detailed embodiment of the invention, there is shown in FIGURES 1 and 2 a horizontally disposed mass element 10 in the form of a relatively flat drag vane having a length and with of considerably greater dimension than its thickness. The mass 10 is supported by means of a spring system including a pair of geophysical spring such as those shown in FIGURE 7 and hereinafter described, the springs permitting reciprocal displacement of the mass 10 only along a sensitive axis 11, as shown in FIGURE 1. Consequently, the mass will be displaced from its neutral position shown in either direction along this sensitive axis 11 in response to an accelerational force.

For measuring the acceleration, there is provided a magnetic means for producing a magnetic restoring force that is made equal and opposite to the accelerational force whereby the restoring force continuously returns the mass 10 to its neutral position shown. The magnetic restoring force means is adapted to operate very rapidly with the result that the system is always maintained in a balanced condition and the mass 10 experiences very little displacement from its neutral position.

The magnetic restoring system preferably comprises a cylindrically shaped magnet 12, positioned underneath the mass 10, and being rotatably supported about is central axis 13 that is transversed to the sensitive axis 11 of the accelerometer. The magnet 12 is circularly polarized whereby the flux being produced by the magnet 10 is directed radially outward from about its periphery. As shown, the magnet 12 is positioned so that flat mass member 10 lies in a plane parallel to but slightly spaced from the plane tangent to the surface of the cylindrical magnet 12. For this reason, the magnetic flux being directed radially outward from the manget 12 passes upwardly through the mass 10 in a direction 14 transverse to the sensitive axis 11 and in the area occupied by the mass 10 when the mass is located in its neutral position. For concentrating the magnetic flux in this area, there is additionally provided an L-shaped magnetically susceptible member 15 forming a return path for the flux, whereby the flux may pass upwardly from the magnet 12 and through the mass 10 and thence be returned to the center and opposite pole of the magnet. The magnetic return member 15 is fixedly positioned above the neutral position of the mass 10 whereby the magnetic flux is always concentrated in this area.

For rotating the magnet 12 and producing a change of flux through the mass 10, there is provided a drive motor 16 whose drive shaft 17 is connected centrally to the magnet 12 serving to rotate the magnet 12 about its axis 13. Upon rotation of the magnet 12, the flux cutting the mass 10 varies at a rate proportional to the speed of the motor 16. This change of flux cutting the mass 10 induces eddy currents in the mass 10, which in turn produces magnetic fields that interacts with the magnetic field of the magnet 12 to produce a displacing force upon the mass 10 in the same direction as the direction of rotation of the magnet. Specifically, referring to FIGURE 1, when the magnet 12 is rotated in a clockwise direction, the resulting force operating upon the mass 10 and being produced by the induced eddy currents therein, operates in a direction to displace the mass 10 to the right whereas when the magnet 12 is being rotated in a counter-clockwise direction, the force operating upon the mass is in the direction toward the left of FIGURE 1.

The restoring force being generated by the rotating magnet 12 is in proportion to the speed of rotation of the magnet 12 since the greater the rate of rotation of the magnet, the greater the change of flux through the mass 10 and hence the greater the magnetic force operating upon the mass 10. However, assuming that the magnet 12 is provided with a continuously magnetized outer periphery, the flux density in the region passing through the mass 10 remains substantially constant despite the change of flux whereby the magnetic force operating upon the mass 10 is in direct proportion to the speed of rotation of the magnet 12.

For energizing the motor 16 according to the displacement of the mass 10 in response to an accelerational force, there is provided a suitable transducer having a fixed stator winding 19 and a moving winding 18 connected to be displaced with the mass 10. Upon displacement of the mass 10, in response to an accelerational force, a signal is generated by the rotor 18 of the pickoff and this signal is employed to energize the motor 16 in such direction and at such speed that the restoring force being produced by the rotating magnet 12 is sufficient to substantially balance the acceleration force and return the mass 10 to its neutral position. Thus, the force being produced by the linear acceleration directed along sensitive axis 11 and serving to displace the mass 10 is just balanced by the eddy current force being produced by the magnet 12 upon the mass 10 whereby the mass 10 is rapidly restored to its neutral position. Since the magnetic restoring force is proportional to the speed of rotation of the motor 16 and magnet 12, the magnet rotational speed is directly proportional to the acceleration operating upon the mass 10 and a suitable indicator (not shown) may be connected to measure the speed of rotation of the motor shaft 17 thereby to provide a suitable indication or signal proportional to the acceleration. As is also well known, the total angular rotation of a motor is proportional to the integral of the motor rotational speed, and consequently the total shaft angle of rotation of the motor 16, or the total angular displacement of the magnet 12, is proportional to the integral of the acceleration or the velocity. Thus, a second indicator or signal producing means (not shown) may be employed to count the number of cycles of rotation of the motor shaft 17 to produce an indication or signal proportional to the velocity.

For neutrally suspending the mass 10 in a substantially frictionless manner and preventing its displacement along any axis other than the central axis, the spring suspension system preferably comprises a pair of spaced circularly formed flexible disks 20 and 21 such as those shown in FIGURE 7, whose peripheral edges are rigidly supported within a housing (not shown). The flat mass element 10 is supported on a thin horizontal plate 22, whose opposite ends 23 and 24 are connected to the central portions of the flexible disks 20 and 21 whereby the disks 20 and 21 may flex in unison only about the sensitive axis 11 but cannot bend or flex about any other axis.

It is to be particularly noted that by this spring suspension, the mass 10 is neutrally suspended above the cylindrical magnet 12 in such manner that it may be displaced along the sensitive axis 11 but is constrained from moving along any other axis. The effect of gravity force is also substantially eliminated.

FIGURE 3 illustrates in block diagram form the preferred electromechanical servo system that responds to the signal from the transducer or pick-off winding 18 to rapidly control the speed of the motor 16 for rotating the magnet 12. As shown, the output signal from the pick-off stator coil 18, proportional to the displacement of the mass along its sensitive axis 11, is directed to a preamplifier 26 where the signal is amplified and conveyed to a demodulator network 27 which separates the intelligence signal from the carrier. The pick-off or transducer 18 may be in the form of a conventional E-bridge to provide an extremely linear output signal in response to displacement of the mass, and as well known, such a transducer is energized by a rather high frequency signal which is modulated according to the relative movement between the fixed and moving of the pick-off. The demodulated signal from the demodulator network 27 is again amplified by amplifier 28, and this latter signal is then directed to energize one winding 31 of a two phase servo motor 16 having a pair of windings 30, 31 incorporated therewith, the motor being connected to rotate the cylindrical magnet 12, as shown in FIGURES 1 and 2. Since this is a velocity feedback system, the shaft 17 of the motor 16 is magnetically connected in feedback to position the pick-off moving winding 18. Further details of servo systems of this type are well known to those skilled in the art and additional description thereof is not considered necessary.

Since the magnetic restoring force operating upon the mass 10 depends upon the induction of eddy currents within the mass 10, the mass 10 should be made of low resistance material and preferably having a low temperature coefficient of resistivity. Suitable materials for use in the mass 10 are copper-manganese alloy or aluminum-silicon-bronze alloy. If the accelerometer is subjected to wide temperature variations, it may also be desired to provide a heater and regulator unit for maintaining the temperature of the mass constant despite changes in the ambient temperature. This may be accomplished by providing a resistance thermometer winding (not shown) on the mass 10 to continuously detect its temperature and variably energize an electrical heating winding to maintain its temperature substantially constant.

If a greater magnetic restoring force is required to continuously return and maintain the mass 10 in its neutral position, a pair of magnets such as 12 may be employed (not shown). In this case, one of the magnets may be positioned above the mass 10 and the other magnet positioned below the mass 10 as shown. Both magnets would in this modification be of the same cylindrical configuration and be jointly driven by the motor 16 thereby to produce a considerably greater change in flux through the mass 10 and produce a greater restoring force operating upon the mass 10.

In the embodiment described above, the magnetic restoring force may be considered to be of the analog variety wherein a continuous magnetic force is exerted upon the mass 10 in proportion to the speed of rotation of the circumferentially polarized magnet 12. However, in many instances, it may be desired to provide a digitally operating magnetic restoring force and this may be accomplished by employing a multiple pole magnet as shown in FIGURE 4. The multiple pole magnet 34 is preferably of cylindrical configuration, but its outer periphery is provided with a number of outstanding discrete poles 35, 35a thereon, which poles 35, 35a pass beneath the mass 10 during rotation of the magnet 34. The operation of a system using the multipole magnet 34 is essentially the same as that when using the continuous pole surface magnet 12 except for the fact that the magnetic restoring force is produced in discrete pulses with the number of pulses being produced in any given period of time determining the average restoring force operating upon the mass 10. Stated in another manner, the use of a discontinuous surface magnet, such as the magnet 34, produces an eddy current pulse in the mass 10 as each pole 35, 35a of the magnet passes beneath the mass 10. The generation of each eddy current pulse produces a reaction force on the mass and consequently the pulse rate is proportional to the acceleration force operating upon the mass 10. For determining the velocity, the total number of pulses being produced in any given time may be summed to provide the integral of the acceleration or the velocity. Such pulse count may be obtained by employing a second pickup coil (not shown) close to the poles of the magnet 34 for determining the number of poles passing the pickup coil during each period of time. The pickup coil produces a signal as each pole 35, 35a of the magnet passes by and these pulse signals may be directed to a digital counter to accumulate the pulses and provide an indication of the pulse count representing the desired velocity quantity.

An air shield formed of a non-conducting material is located between the geophysical springs 20, 21 below the horizontal vane 22. The air shield as shown in FIGURE 1 includes a pair of substantially parallel side walls 38, 38a which are located between the springs 20, 21 and substantially parallel thereto, each side wall having a flange 37, 37a integral therewith, the flanges being substantially perpendicular to the side walls 38, 38a of the air shield.

FIGURES 5 and 6 show a schematic modification of the construction shown in FIGURES 1 and 2.

In this construction, a strip or vane element 40 is mounted between a pair of geophysical springs 41, 42 such as those shown in FIGURES 1 and 2, one embodiment of the geophysical spring being shown in FIGURE 7.

A pick-off coil 44 is attached to one end of the vane element, the pick-off coil coacting with a differential transformer, located adjacent the pick-off coil, to indicate the longitudinal displacement of the mass and therefore the acceleration thereof along longitudinal axis 45.

The output of the pick-off coil is amplified in an amplifier 46, shown in FIGURE 5.

The amplified voltage is supplied to the control phase 47 of a servo motor 48, which is mechanically coupled to and rotates a permanent magnet 50, which is mounted adjacent one face of the vane or mass 40, as shown in FIGURE 1.

The motor velocity is required to produce eddy currents in the vane.

Current reaction force in the vane is formed in a strip of low resistance metal suspended between the two geophysical springs.

The permanent magnet is rotated by the motor 48 located adjacent the vane 40, thereby provides a magnetic flux through the strip.

The transformer or E-bridge 51 located adjacent the pick-off coil 44 indicates the longitudinal displacement of the vane 40.

In the place of the single permanent magnet shown on FIGURE 1, a pair of permanent magnets one mounted adjacent each face of the vane can be substituted.

The slip disc or vane 40 functions as the weight of the accelerometer.

Weight=mass $g=m.g$
The acceleration force=$ma$ where $m$=mass
$a$=acceleration
$g$=acceleration due to gravity In order to determine velocity, a counter (not shown) is applied to the motor shaft, to indicate the number of revolutions made by the motor and therefore the permanent magnet.

The magnetic force through the vane is a function of the acceleration.

The integral of the acceleration, or velocity, is a function of the number of revolutions the motor shaft has gone through since acceleration was previously determined.

The counter on the motor shaft gives the number of revolutions of the motor shaft.

Thus according to the present invention, there is provided an accelerometer construction wherein the acceleration responsive mass is supported by a geophysical spring structure in such manner as to be insensitive to accelerations directed along other than the sensitive axis thereof as well as being relatively insensitive to the force of gravity. To measure the accelerational force displacing the mass, there is provided a magnetically operating restoring means, and including a movable magnet that induces a variable eddy current in the mass 10 proportional to the acceleration, which eddy current reacts with the magnet to produce the magnetic restoring force to counterbalance the accelerational force. Consequently the rate of movement of the magnet is made equal to the acceleration force and by measuring this rate of movement the accelerational force may be determined. Furthermore, the integrating function is rather easily performed by measuring the extent of displacement of the magnet which, in effect, integrates the magnetic restoring force and provides a signal proportional to the velocity quantity.

Although but one preferred embodiment of the invention, together with certain modifications, has been illustrated and described, it is believed evident that one skilled in the art may make many changes and variations in the structure disclosed without departing from the spirit and scope of the invention. Consequently, this invention should be considered as being limited only according to the following claims appended thereto.

What is claimed is:

1. An integrating accelerometer comprising a relatively flat mass having a length and width considerably greater than its thickness, said mass having low electrical resistivity, spring means for suspending the mass for deflection along one sensitive axis only and preventing deflection along other axes, said spring means normally supporting the mass in a given neutral position, circumferentially polarized substantially cylindrical magnetic means for producing a concentrated magnetic flux through said mass at the neutral position and energizable to vary the rate of change of magnetic flux at said position, position transducer means responsive to the displacement of said mass from said neutral position, for determining deflection of said mass from said position along said sensitive axis, and actuating means energized by said transducer means for actuating said magnetic means to vary the rate of change of flux at said neutral position responsively to deflection of said mass from said neutral position, said actuating means being adapted to rotate the magnetic means at a speed proportional to the displacement of the mass, whereby said mass is restored to said neutral position by a magnetically generated force equal to and opposite the acceleration force acting upon said mass.

2. In the accelerometer of claim 1, said magnetic means producing a constant flux density at said given neutral position and being variable by said actuating means to continuously vary the rate of change of flux at said given neutral position while maintaining the density of said flux constant.

3. In the accelerometer of claim 1, said magnetic means producing different levels of flux density and being variable by said actuating means to alternately translate each level of flux in sequence through said given neutral position at a rate determined by said actuating means.

4. In an accelerometer, a relatively flat mass, having a length and width greater than its thickness, mass having low electrical resistivity, suspending means for said mass permitting displacement of said mass along a given sensitive axis and normally supporting said mass in a given neutral position, a circumferentially polarized substantially cylindrical magnet means producing a concentrated flux at said given neutral position and being rotatable to vary the rate of change of flux at said given position for inducing eddy currents in said mass, position transducer means responsive to displacement of said mass along said axis from said neutral position for producing an electrical signal, and an actuator energized by such signal for rotating said magnet at a speed proportional to the displacement of said mass, whereby said mass is returned to said neutral position by a magnetically generated force equal and opposite to the acceleration force acting upon said mass, and the acceleration is determinable by measuring the speed of rotation of said magnet.

5. In the accelerometer of claim 4, said suspending means including a pair of geophysical springs fixedly positioned transverse to said sensitive axis and being flexible to support said mass for movement only along said sensitive axis.

6. In the accelerometer of claim 4, said magnetic means comprising a circularly polarized substantially cylindrical magnet rotatably supported about an axis transverse to said sensitive axis and with said mass being located in a plane parallel to a tangent plane to said cylindrical magnet.

7. In the accelerometer of claim 6, said actuator comprising a motor for rotating said circularly polarized magnet.

8. In the accelerometer of claim 4, said magnet means comprising a substantially cylindrical magnet having a plurality of discrete poles about its periphery to produce a digitally operating restoring force and wherein the acceleration is determined by measuring the number of poles passing said neutral position in a given time interval.

9. In the accelerometer of claim 4, said cylindrical magnet being circularly polarized to provide a continuous pole about its outer periphery.

10. In the accelerometer of claim 4, said magnetic means comprising a circularly polarized substantially cylindrical magnet rotatably supported about an axis transverse to said sensitive axis and producing a flux through said mass at a given neutral position, and a magnetically susceptible member providing a return path for said flux, one face of the return path being located adjacent and substantially parallel to one flat face of the mass, a narrow gap being formed between the face of the return path and the face of the mass, said return path having a portion thereof fixedly positioned adjacent one end of the permanent magnet, on the opposite side of said mass.

References Cited in the file of this patent

UNITED STATES PATENTS

| | | |
|---|---|---|
| 2,638,347 | Maggi | May 12, 1953 |
| 2,750,461 | Bunch | June 12, 1956 |
| 2,767,973 | Ter Veen | Oct. 23, 1956 |
| 2,888,256 | Sedgfield | May 26, 1959 |
| 2,933,298 | Allison | Apr. 19, 1960 |
| 2,964,949 | Wilcox | Dec. 20, 1960 |

FOREIGN PATENTS

| | | |
|---|---|---|
| 1,212,770 | France | Oct. 26, 1959 |

OTHER REFERENCES

An article from Aviation Age, January 1958, pages 50 through 55, entitled "A Directly Double Integrating Accelerometer" by Kenneth E. Pope.